(12) United States Patent
Kawano

(10) Patent No.: US 7,663,088 B2
(45) Date of Patent: Feb. 16, 2010

(54) BOLOMETER-TYPE INFRARED IMAGING APPARATUS INCLUDING A ONE OR TWO DIMENSIONAL SENSOR ARRAY SEMICONDUCTOR DEVICE

(75) Inventor: Katsuya Kawano, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/826,086

(22) Filed: Jul. 12, 2007

(65) Prior Publication Data

US 2008/0048763 A1 Feb. 28, 2008

(30) Foreign Application Priority Data

Jul. 14, 2006 (JP) ............... 2006-194337

(51) Int. Cl.
  *H01J 40/14* (2006.01)
  *H01L 27/00* (2006.01)
(52) U.S. Cl. ................ 250/214 R; 250/208.1
(58) Field of Classification Search ............ 250/214 R, 250/214 A, 208.1, 221, 338.1, 338.4; 348/164, 348/165, 216.1; 257/290–292, 440
See application file for complete search history.

(56) References Cited

U.S. PATENT DOCUMENTS 5,952,659 A * 9/1999 Yoneyama et al. .......... 250/332
5,955,726 A * 9/1999 Takashima et al. ...... 250/214 R
2003/0230733 A1 12/2003 Tanaka
2006/0231760 A1* 10/2006 Lee et al. ................. 250/338.1

FOREIGN PATENT DOCUMENTS

JP 2003-318712 A 11/2003
JP 2004-020325 A 1/2004

\* cited by examiner

*Primary Examiner*—Que T Le
*Assistant Examiner*—Pascal M Bui-Pho
(74) *Attorney, Agent, or Firm*—Foley & Lardner LLP

(57) ABSTRACT

Disclosed is a bolometer infrared imaging device including a plural number of readout circuits, each comprising a bias circuit that includes a bias transistor that supplies a constant voltage to a bolometer device, a bias cancellation circuit that includes a canceller transistor that removes offset current component of the bolometer device and an integrating operational amplifier that integrates the difference current between the current flowing in the bias transistor and that flowing in the canceller transistor. The bias circuit includes a source follower circuit that receives a first input voltage and supplies an output voltage to the gate of the bias transistor. The bias cancellation circuit includes a source follower circuit that receives a second input voltage and supplies an output voltage to the gate of the canceller transistor.

6 Claims, 6 Drawing Sheets

BOLOMETER-TYPE INFRARED IMAGING APPARATUS INCLUDING A ONE OR TWO DIMENSIONAL SENSOR ARRAY SEMICONDUCTOR DEVICE

RELATED APPLICATION

This application is based upon and claims the benefit of the priority of Japanese patent application No. 2006-194337, filed on Jul. 14, 2006, the disclosure of which is incorporated herein in its entirety by reference thereto.

FIELD OF THE INVENTION

This invention relates to a semiconductor device. More particularly, it relates to a bolometer-type infrared imaging apparatus which includes a one-dimensional or two-dimensional sensor array and a readout circuit.

BACKGROUND OF THE INVENTION

In a bolometer-type infrared imaging apparatus, infrared signals are extremely low in level. Hence, in a readout circuit, variances other than infrared signals need to be suppressed. Among the important items of characteristics of the readout circuit, there are a circuit noise, a high temperature spurious signal and temperature drift of the circuit. It is noted that smaller the values of these characteristics are desirable to improve characteristics of the readout circuit.

In the conventional bolometer-type infrared imaging apparatus, an operational amplifier (opamp) is used in a portion of the circuit of the apparatus to reduce temperature drift or to eliminate the high temperature spurious signal. Reference is had to Patent Documents 1 and 2 showing a bolometer-type infrared imaging apparatus employing an operational amplifier for the purpose of reducing temperature drift and eliminating high temperature spurious signals.

FIG. 4 shows an overall configuration of the apparatus disclosed in Patent Document 1, that is, the circuit configuration of an imaging apparatus including a readout circuit and its periphery. The circuit comprises a two-dimensional matrix array of thermo-electric devices 202 and is adapted to sense and output received infrared signals from device to device. The infrared signals may be processed in parallel by readout circuits 206 connected to the thermo-electric devices 202 via pixel switches 201 and horizontal switches 204 as selected by a vertical shift register 205. Outputs of the readout circuits are sequentially output to output terminal 210 by horizontal shift register 208. The thermo-electric devices 202 are two-dimensionally arranged on a substrate and sequentially selected based on the switching operations of the pixel switches 201 and horizontal switches 204. The pixel switches 201 are arranged at points of intersection of signal lines 203 and scan lines 211. Each pixel switch 201 is an NchMOSFET having a source grounded, having a drain connected via thermo-electric device 202 to the signal line 203 and having a gate connected to a scan line. The signal line 203 is connected via horizontal switch 204 to the readout circuit 206, an output of which is connected via a multiplexer switch 207 to an output buffer 209. The multiplexer switches 207 are on/off controlled by the horizontal shift register 208. To read signals of the thermo-electric devices 202, the readout circuits 206 are provided at every two columns of the matrix. The vertical shift register 205 sequentially selects the rows of the matrix, while the horizontal shift register 208 sequentially selects the multiplexer switches 207 to deliver outputs of the readout circuits 206 to the output buffer 209.

FIG. 5 depicts an illustrative configuration of a readout circuit disclosed in Patent Document 1. Input voltages VBOL and VCAN are supplied via input voltage lines to a readout circuit 134. This readout circuit includes a bias circuit 141, a bias cancellation circuit 142 and an integrator (integrating operational amplifier) 116. The bias circuit applies a constant voltage to a thermo-electric device 102, and the bias cancellation circuit removes the offset current other than the signals of an object being imaged. The integrator (integrating operational amplifier) is connected to a connection node of the bias circuit 141 and the bias cancellation circuit 142.

The readout circuits 134 operates in parallel simultaneously. Resistance changes of the respective thermo-electric devices 102, corresponding to the strength of infrared incident light from the object being imaged, are detected as current difference between the current through the thermo-electric device 102 as determined by the voltage VBOL and that through the bias cancellation circuit 142 as determined by the voltage VCAN. The so detected current difference is integrated by an integrator 116 and simultaneously transformed into a corresponding voltage value, which is output.

In more detail, referring to FIG. 5, the bias circuit 141 includes an NchMOSFET 104, referred to below as a bias transistor 104, and an operational amplifier 105, referred to below as operational amplifier 105. The bias transistor 104 has its source connected to one end of the thermo-electric device 102. The operational amplifier 105 has an output terminal connected to the gate of the bias transistor 104, while having an inverting input terminal (−) connected to the source of the bias transistor 104. A bias voltage 108 is applied to the non-inverting input terminal (+) of the operational amplifier 105. The bias transistor 104 has a source connected via a horizontal switch 103 to the thermo-electric device 102. It is noted that a switch 101 connected between the thermo-electric device 102 and the ground GND operates as a pixel switch.

The bias circuit 141 applies a constant voltage to each thermo-electric device 102 to transform a change in resistance of the thermo-electric device 102 into a corresponding current value. By this configuration, the bias circuit 141 is able to control the voltage, applied to the thermo-electric device 102, with high accuracy, thereby removing the effect of the temperature coefficient of the gate-to-source voltage VGS of the bias transistor 104 (temperature drift). Further, the bias circuit 104 drives the bias transistor 104 with low impedance to suppress stray noise in each readout circuit 134.

The drain current of the bias transistor 104, that is, the current of the thermo-electric device 102, includes, in addition to the infrared signal component, a significant offset component, on which is present an extremely low level of a signal component from an object being imaged. The bias cancellation circuit 142 is provided to remove this offset component.

The bias cancellation circuit 142 includes a bias cancellation resistor 109, a PchMOSFET 111 and an operational amplifier 112. The bias cancellation resistor 109 has one end connected to a power supply. The PchMOSFET 111, which is also referred as a canceller transistor, has a source connected to the other end of the bias cancellation resistor 109. The canceller transistor 111 has a gate connected to an output terminal of the operational amplifier 112, while having a source connected to an inverting input terminal (−) of the operational amplifier 112, the non-inverting input terminal (+) of which is supplied with a bias cancellation voltage 114. The canceller transistor 111 has a source connected to a power supply VCC via series resistances of the bias cancellation resistor 109 and a switch 110. Thus, as with the bias circuit 141, the bias cancellation circuit 142 is configured to exercises control to remove the effect of the gate-to-source voltage VGS of the canceller transistor 111. With the bias cancellation resistor 109, the stray noise of each readout circuit may be suppressed because the canceller transistor 111 is driven with a low impedance.

The connection node of the drain of the bias transistor 104 and the drain of the canceller transistor 111 is connected to a connection node of the inverting input terminal (−) of an operational amplifier 116 (integrator) and one ends of capacitors 119 and 122 for integrating current variations of the thermo-electric device 102. The capacitors 119 and 122 are referred to as integrating capacitors. The opposite ends of the integrating capacitors 119 and 122 are connected common to the output terminal of the operational amplifier 116, the non-inverting terminal (+) of which is connected to VCC/2 (one-half of the power supply voltage). The inverting input terminal (−) of an operational amplifier 116, that is, the drains of the bias transistor 104 and the canceller transistor 111, are normally fixed at VCC/2. The integrated voltages of the integrating capacitors 119 and 122 are taken out at an output terminal of the operational amplifier 116 and sequentially output at an output terminal 140 from plural readout circuits 134. Meanwhile, control of switches 118 and 121, connected to one ends of the integrating capacitors 119 and 122, and switches 120 and 123, connected between the opposite ends of the integrating capacitors 119 and 122 and the output terminal of the operational amplifier 116, is not described herein and reference is had for details to the disclosure of Patent Document 1. The integrating capacitors 119 and 122 are also referred to as integrating/holding capacitors.

A reset switch 125 is connected between the inverting input terminal (−) and the output terminal of the operational amplifier (integrator) 116. The voltage at the inverting input terminal (−) of the operational amplifier 116 is set to VCC/2, a voltage at the non-inverting terminal (+) of the operational amplifier 116, by turning the switch 125 ON after outputting the voltage integrated by the integrating capacitors 119 and 122.

FIG. 6 shows the configuration disclosed in Patent Document 2. Referring to FIG. 6, a resistance array 301 (R-Array) includes a set of resistors, for example, a set of bolometers having resistance values changed by incident infrared rays. These resistors are arrayed in column and row directions in a two-dimensional matrix and a plurality of readout circuits 302 are arranged on its column side. Each readout circuit 302 includes a bias transistor 304 (NMOS transistor), an operational amplifier 305, a canceller transistor 307 (PMOS transistor) and an operational amplifier 308. An operational amplifier 309 (integrating amplifier) has an inverting input terminal (−) connected to a connection node of the drains of the bias transistor 304 and the canceller transistor 307. The non-inverting terminal (+) of the operational amplifier 309 is supplied with a constant voltage 310. An integrating capacitor 303 and a switch 311 are connected in parallel between the output terminal and the inverting input terminal (−) of the operational amplifier 309. To compensate for resistance variations of the resistances of the R-array 301, multi-valued voltage generators 317, 318, multi-valued voltage buses 315 and 316, and multi-valued voltage selection switches 313 and 314 within each readout circuit 302, are provided between the bias power supply terminal, bias canceller power supply terminal and the non-inverting input terminals (+) of the operational amplifiers 305 and 308. The multi-valued voltage generators adjust the voltages to be supplied to the resistors from one readout circuit 302 to another. The multi-valued voltage buses transmit voltages to the readout circuits. This circuit configuration allows selecting one voltage from the multi-valued voltage buses. The readout circuits 302 may be run in parallel to carry out integration to provide longer integrating time, thereby reducing the noise.

[Patent Document 1]
  JP Patent Kokai Publication No. JP-P2003-318712A

[Patent Document 2]
  JP Patent Kokai Publication No. JP-P2004-20325A

SUMMARY OF THE DISCLOSURE

The entire disclosure of Patent Documents 1 and 2 is incorporated herein by reference thereto.

In the above-described configurations, there is a problem of increase both in circuit area and in power consumption in order to reduce noise. Firstly, the mechanism of high temperature spurious signal and the temperature drift will be described with reference to FIGS. 3A and 3B, based on the analysis by the present inventor.

FIG. 3A shows a configuration not using an operational amplifier in the bias circuit or in the bias cancellation circuit. FIG. 3B schematically shows voltage waveforms at a reset switch, an output terminal and at a non-inverting input terminal, by way of illustrating the integrating operational amplifier.

Referring to FIG. 3A, a bias transistor (NMOS transistor) 8 of a bias circuit has a gate connected to a first input voltage line 6, while having a source connected to one end of a bolometer device 5, such as to supply a bias voltage to the bolometer device 5. A canceller transistor 17 (PMOS transistor) of the bias cancellation circuit has a gate connected to a second input voltage line 7, while having a source connected via a resistor 16 and a switch to the power supply, and having a drain connected to the drain of the bias transistor 8. A connection node of the drains of the bias transistor 8 and the canceller transistor 17 is connected to an inverting input terminal (−) of an integrating operational amplifier 4. The bias cancellation circuit removes an offset component of the drain current of the bias transistor 8, that is, the current flowing in the bolometer device 5. The integrating capacitor 4 causes the difference between the drain currents flowing through the bias transistor 8 and the canceller transistor 17 to be accumulated in a capacitor 22. Meanwhile, in FIG. 3A, a switch 28 corresponds to the pixel switch 101 of FIG. 5, and a horizontal switch (103 of FIG. 5), connected between the bolometer device and the source of the bias transistor, is not shown.

In the illustrative configuration, shown in FIG. 3A, the first input voltage line 6 and the second input voltage line 7, connected commonly to each of the readout circuits, are directly connected to the gates of the bias transistor 8 and the canceller transistor 17 of the readout circuit that supply the bias voltages to the bolometer devices. Hence, the input voltage is affected by voltage variation in the readout circuit, as in the case of light incidence from a high temperature object.

Although the drain voltages of the transistors 8 and 17 of the readout circuit are normally fixed at 5V, this voltage is fluctuated in case the light is incident from a high temperature object on the bolometer device (thermoelectric device) 5.

The resistance value of the bolometer device 5 decreases on light incidence from the high temperature object. Thus, when the integrating operational amplifier 4 of the readout circuit (1b of FIG. 3A) has commenced an integrating operation, the current flows at once from the integrating capacitor of the integrating operational amplifier 4 to the bolometer device 5 the instant the reset switch (RSTSW) is turned OFF. This breaks imaginary short of the integrating operational amplifier 4, thus generating voltage changes at the inverting input terminal (−) of the integrating operational amplifier 4 (during the period of (1) of FIG. 3B). An arrow (1) in the readout circuit 1b of FIG. 3A indicates the current flowing from the integrating capacitor of the integrating operational amplifier 4 through the bolometer device 5 via bias transistor 8.

Thereafter, when the output of the integrating operational amplifier 4 is saturated, the imaginary short of the integrating operational amplifier 4 is similarly broken, so that the voltage at the inverting input terminal (−) of the integrating operational amplifier 4 is lastly lowered to about 4.3V, that is a clip voltage equal to 5V less the forward voltage of the diode (see voltage waveform near the diode B in (1)' of FIG. 3A and the period of (1)' of FIG. 3B).

Thus, when the voltage at the inverting input terminal (−) of the integrating operational amplifier 4 is varied, the voltage at the drain of the bias transistor 8 or the canceller transistor 17 is lowered. Hence, the gate voltage is also varied due to the parasitic capacitances of the transistors 8 and 17, represented in FIG. 3A by the parasitic capacitance between the drains and the gates of the transistors 8 and 17, thus causing voltage variations on the input voltage lines 6 and 7 which are connected to the gates of the transistors 8 and 17. That is, drain voltage variations of the transistors rush into the input voltage lines of the gates due to parasitic capacitance, as shown at (2) in FIG. 3A.

Thus, when the light from the high temperature object is incident on some of the bolometer devices 5, displacement current is generated in all readout circuits, through the first and second input voltage lines 6 and 7, under the effect of the voltage variations (stray noise), thus affecting outputs of the other bolometer devices 5 not illuminated by light from the high temperature object. The displacement current shown by arrow (3) is generated in the readout circuit 1a of FIG. 3A not illuminated by light from the high temperature object.

Meanwhile, the variations at the inverting input terminal (−) of the integrating operational amplifier 4 may be suppressed to some extent by improving the driving capability of the integrating operational amplifier 4. However, the effect achieved is relatively small.

On the other hand, if the driving capability of the integrating operational amplifier 4 (mutual conductance) is made higher, the power consumption of the circuit is increased.

In the circuit configuration in the related arts, operational amplifiers (112 and 105 of FIG. 5, and 302 and 308 of FIG. 6) are employed to drive the bias transistor or the canceller transistor at low impedance to suppress variations in the gate voltage ascribable to high temperature spurious signals.

In the circuit configuration of FIG. 3A, not employing operational amplifiers, the drain currents of the bias transistor or the canceller transistor 17 are varied by temperature variations in the chip and are output as the temperature drift of the circuit. This results because the gate-to-source voltages VGS of the bias transistor 8 and the canceller transistor 17 have high temperature coefficients ascribable to the threshold value Vt proper to the transistors.

Hence, the circuit of the related art has a configuration in which the drain current is not affected by the gate-to-source voltage VGS of the transistor by the operational amplifier (compensation of voltage drop).

That is, the operational amplifier also has the function of removing the effect of the temperature coefficient of the gate-to-source voltage VGS.

However, since the infrared light signal is extremely low in amplitude, it is necessary to reduce the noise of the operational amplifier. To reduce the effect of 1/f noise, the operational amplifier is made large in area. Moreover, to reduce the white noise, it is necessary to increase the mutual conductance Gm of the operational amplifier, resulting in an increase in the power consumption of the operational amplifier.

In the circuits shown in FIG. 5 and FIG. 6, two such operational amplifiers are provided in each readout circuit (112 and 105 in FIG. 5 and 305 and 308 in FIG. 6), resulting in an increase in the overall chip size and in power consumption.

As described above, since the operational amplifier used in the readout circuit of the bolometer infrared imaging device must be reduced in noise, the chip area is as well as power consumption is increased.

That is, the conventional circuit suffers from the problem that, to achieve optimum characteristics of the circuit with respect to the circuit noise, high temperature spurious signals as well as the temperature drift, particularly desired of the readout circuit, the circuit is increased in size with increase in power consumption.

The invention disclosed in the present application may be summarized substantially as follows:

A semiconductor device according one aspect of to the present invention comprises a plurality of readout circuits each including:

a bias circuit that supplies a bias voltage to a bolometer device;

a bias cancellation circuit that removes an offset current of said bolometer device; and an integrator that has an input end connected to a connection node of said bias circuit and said bias cancellation circuit. The bias circuit includes: a first follower transistor that receives a voltage on a first input voltage line as an input and outputs a voltage which follows the input voltage; and a bias transistor that receives the output voltage of said first follower transistor and supplies a bias voltage to one end of said bolometer device.

The bias cancellation circuit includes: a second follower transistor that receives a voltage on a second input voltage line as an input and outputs a voltage which follows the input voltage; and a canceller transistor that receives an output voltage of said second follower transistor. An output of said canceller transistor and an output of said bias transistor are coupled to the input end of said integrator.

According to the present invention, the first follower transistor may form a first source follower circuit, the second follower transistor forming a second source follower circuit. The bias transistor may be a MOS transistor of a first conductivity type having a gate connected to an output of the first source follower circuit and having a source connected to one end of the bolometer device. The canceller transistor may be a MOS transistor of a second conductivity type having a gate connected to an output of the second source follower circuit, having a source connected to a power supply via a resistor and a switch, and having a drain connected to the drain of the bias transistor.

According to the present invention, the semiconductor device may further comprise a first VGS removal voltage generating circuit and a second VGS removal voltage generating circuit.

The first VGS removal voltage generating circuit may include a first operational amplifier having a non-inverting input terminal supplied with a first input voltage, a third source follower circuit receiving an output voltage of the first operational amplifier as input, and a MOS transistor of the first conductivity type. This MOS transistor of the first conductivity type may have a gate supplied with an output voltage of the third source follower circuit, while having a drain connected to a preset voltage and having a source connected to one end of a bolometer device and an inverting input terminal of the operational amplifier. An output terminal of the first operational amplifier may be connected to the first input voltage line.

The second VGS removal voltage generating circuit may include a second operational amplifier having a non-inverting input terminal supplied with a second input voltage, a fourth source follower circuit receiving an output voltage of the second operational amplifier as input, and a MOS transistor of the second conductivity type. This MOS transistor of the second conductivity type may have a gate supplied with an output voltage of the fourth source follower circuit, while having a drain connected to a preset voltage and having a source connected to the power supply via resistor and switch and to an inverting input terminal of the operational amplifier. An output terminal of the second operational amplifier may be connected to the second input voltage line.

In the semiconductor device of the present invention, the bias circuit may include a follower type operational amplifier receiving the voltage on the first input voltage line as input and outputting a voltage which follows the input voltage, and a bias transistor receiving an output voltage of the operational amplifier and applying the bias voltage to the bolometer device.

The bias cancellation circuit may include a follower transistor receiving the voltage on the second input voltage line as input and outputting a voltage which follows the input voltage, and a canceller transistor receiving an output voltage of the follower transistor. An output of the canceller transistor and an output of the bias transistor are coupled to the input end of the integrator.

According to the present invention, the follower transistor may form a source follower circuit. The bias transistor may be a MOS transistor of the first conductivity type having a gate connected to an output of the operational amplifier and having a source connected to the output of the source follower circuit. The canceller transistor may be a MOS transistor of the second conductivity type having a gate connected to an output of the source follower circuit, having a source connected via resistor and switch to a power supply and having a drain connected to the drain of the bias transistor.

In the present invention, the operational amplifier of the bias circuit may have a non-inverting input terminal connected to the first input voltage line, while having an inverting input terminal connected to the source of the bias transistor.

According to the present invention, the semiconductor device may further comprise a VGS removal voltage generating circuit including a second operational amplifier, a second source follower circuit and a MOS transistor of a second conductivity type. The second operational amplifier may have a non-inverting input terminal supplied with a second input voltage. The second source follower circuit receives an output of the second operational amplifier, and the MOS transistor of the second conductivity type may have a gate supplied with an output voltage of the second source follower circuit, while having a drain connected to a preset voltage and having a source connected to a power supply via resistor and switch. The MOS transistor of the second conductivity type may be connected to an inverting input terminal of the operational amplifier. An output of the second operational amplifier may be connected to the second input voltage line.

The meritorious effects of the present invention are summarized as follows.

According to the present invention, in which the input voltage is received by the source follower, it is possible to achieve the function of reducing drift, preventing high temperature spurious signal and lowering noise with small circuit area and low power consumption.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

EXAMPLES OF THE INVENTION

Figure 1:
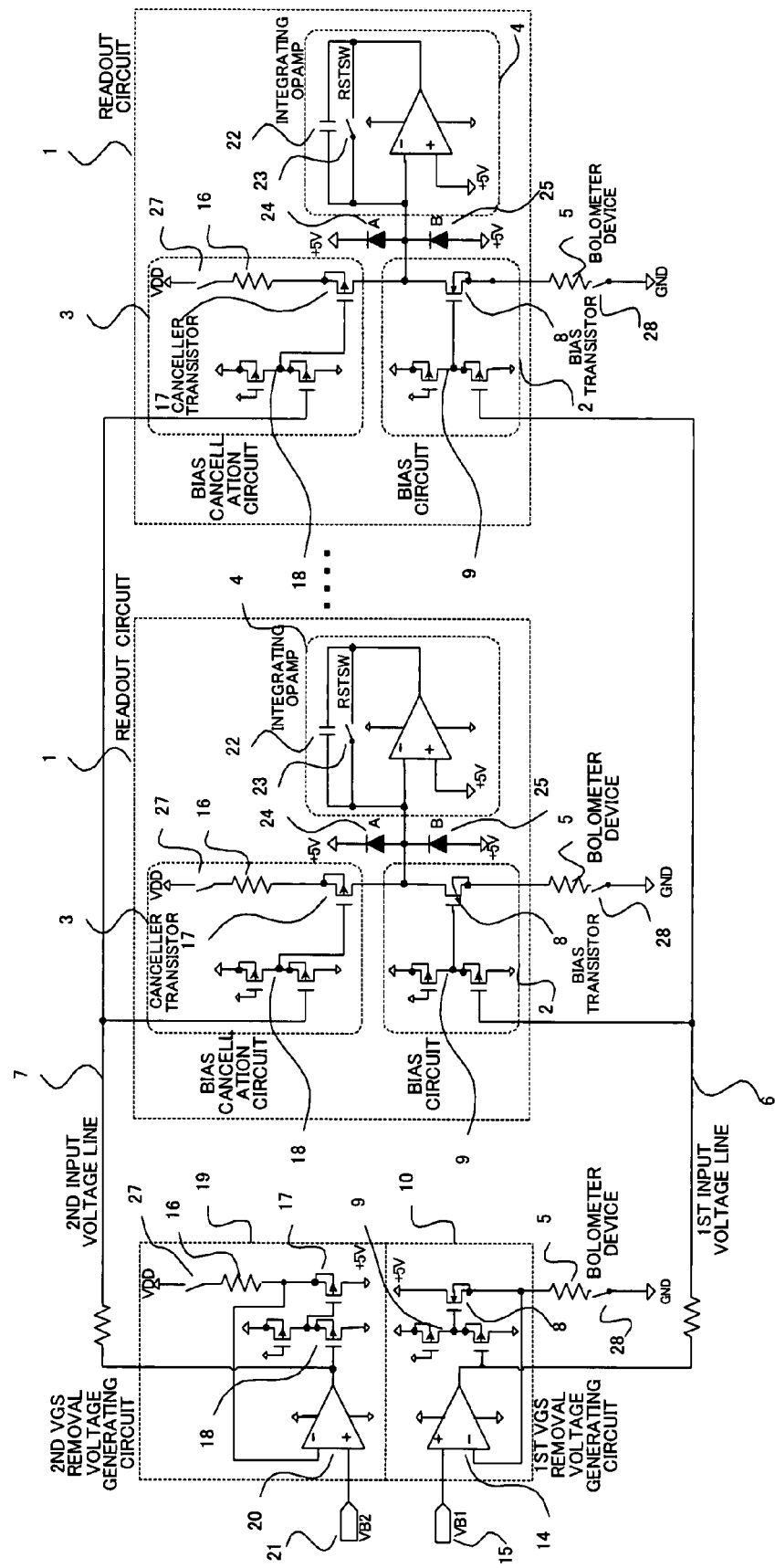
FIG. 1 is a circuit diagram showing a first infrared detector embodying the present invention.

The present invention will now be described with reference to the accompanying drawings. In one mode according to the present invention, as shown in FIG. 1, there are provided a plural number of readout circuits each including a bias circuit 2, a bias cancellation circuit 3 and an integrating operational amplifier (integrator) 4. The bias circuit has a bias transistor 8 for supplying the constant voltage to a bolometer device 5, and the bias cancellation circuit has a canceller transistor 17 for removing an offset component of the current flowing in the bolometer device. The integrating operational amplifier (integrator) 4 integrates the difference current flowing through the bias and canceller transistors. The bias circuit 2 includes a first source follower circuit 9 receiving the voltage on the first input voltage line 6 to supply the output voltage to the gate of the bias transistor 8. The bias cancellation circuit 3 includes a second source follower circuit 18 receiving the voltage on the second input voltage line 7 to supply the output voltage to the gate of the canceller transistor 17. In the present invention, there may be provided an operational amplifier 14 and an operational amplifier 20. The operational amplifier 14 generates a voltage equal to the sum of the first input voltage (VB1) and a voltage corresponding to the gate-to-source voltage VGS of the bias transistor to supply the so generated sum voltage to the first input voltage line 6. The operational amplifier 20 generates a voltage equal to the sum of the second input voltage (VB2) and a voltage corresponding to the gate-to-source voltage VGS of the canceller transistor to supply the so generated voltage to the second input voltage line 7. In the mode according to the present invention, the operational amplifier 14 generates a voltage equal to the sum of the first input voltage (VB1) and a voltage corresponding to the gate-to-source voltage VGS of each of the bias transistor 8 and a lower stage transistor of the source follower circuit 9 to supply the so generated voltage to the first input voltage line, while the operational amplifier 20 generates a voltage equal to the sum of the second input voltage (VB2) and a voltage corresponding to the gate-to-source voltage VGS of each of the canceller transistor 17 and a lower stage transistor of the source follower circuit 18 to supply the so generated voltage to the second input voltage line.

Figure 2:
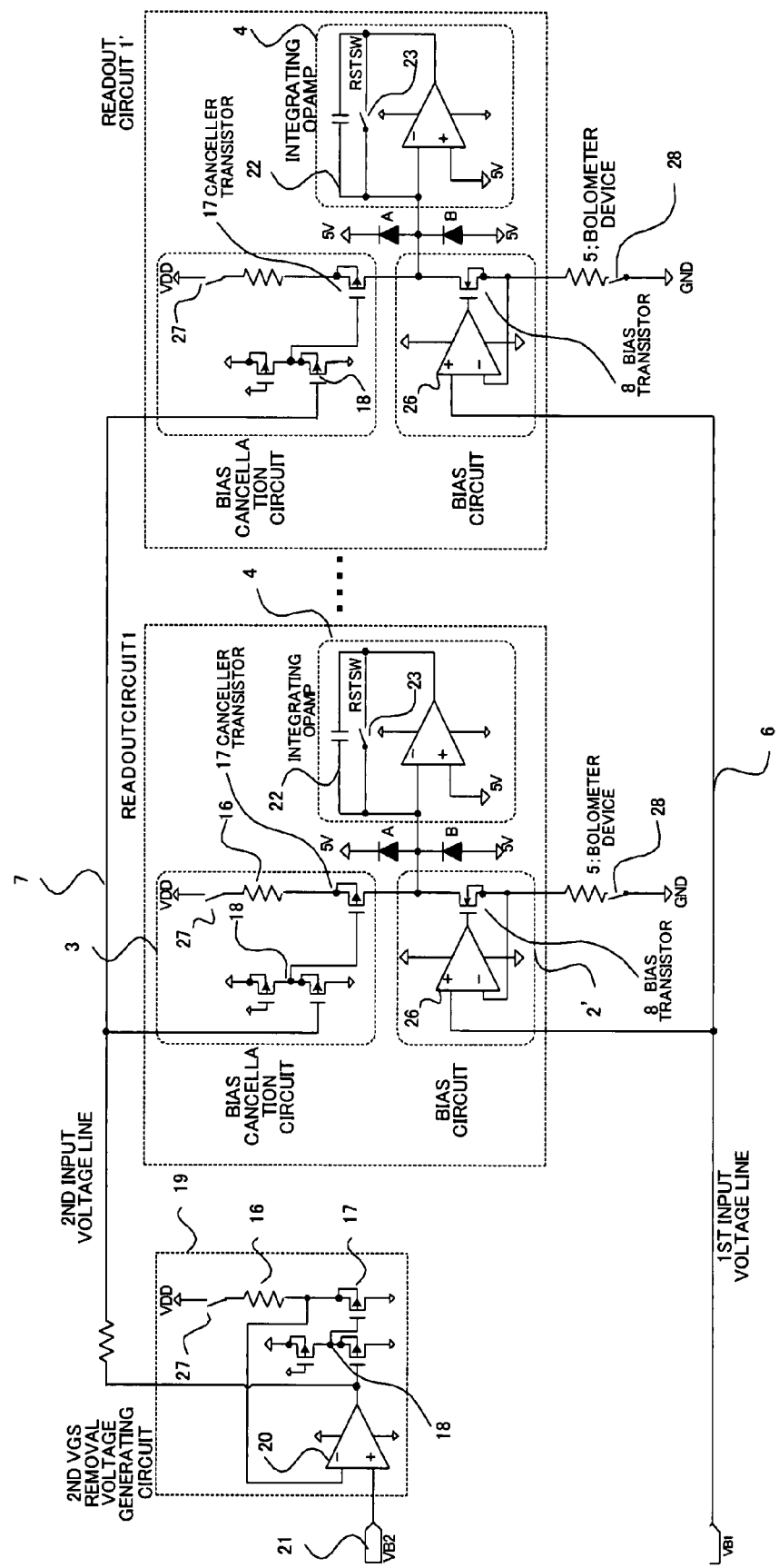
FIG. 2 is a circuit diagram showing a second infrared detector embodying the present invention.
Figures 3A, 3B:
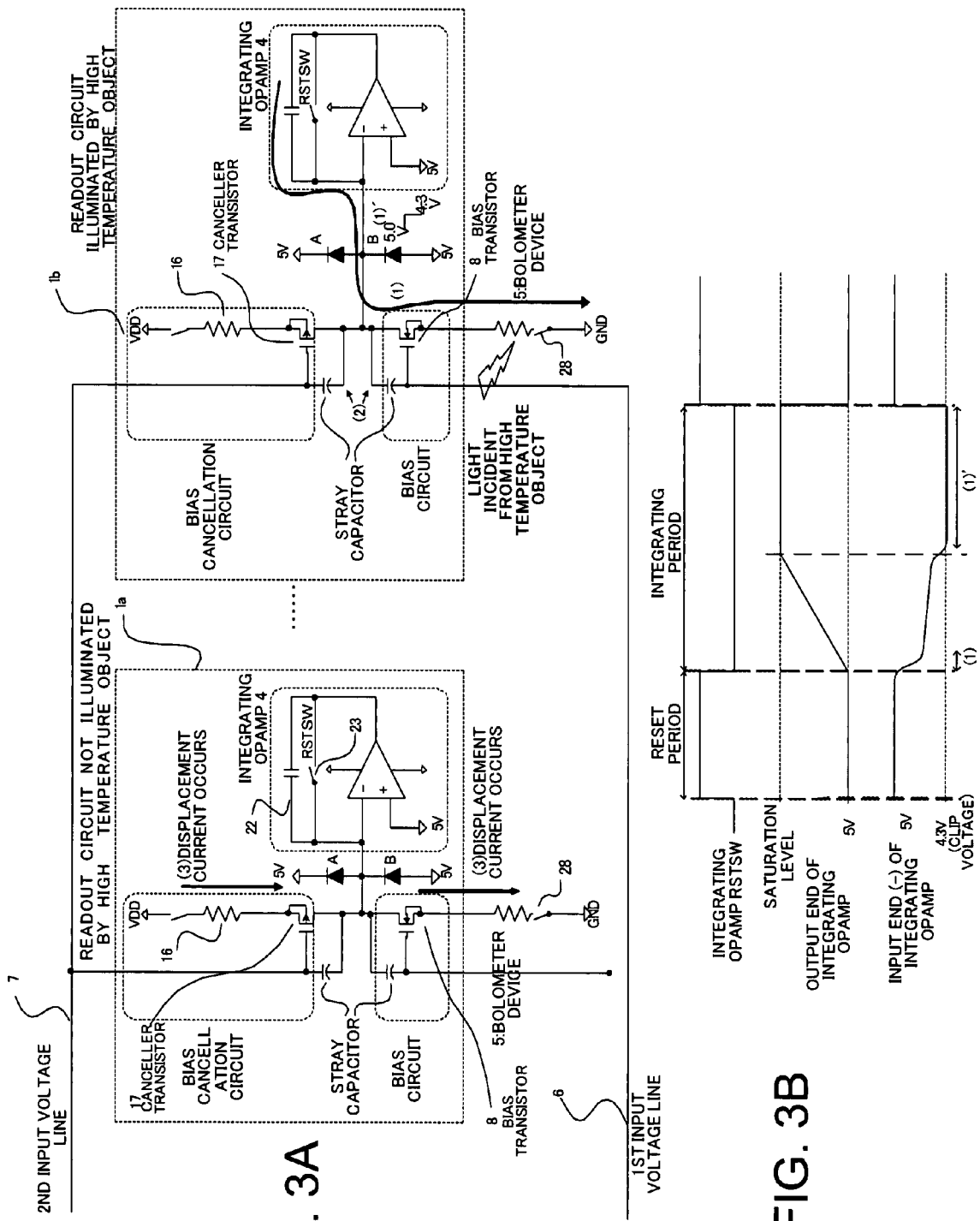
FIG. 3A is a circuit diagram for illustrating the mechanism of a high temperature spurious signal.
FIG. 3B is a corresponding timing diagram.
Figure 4:
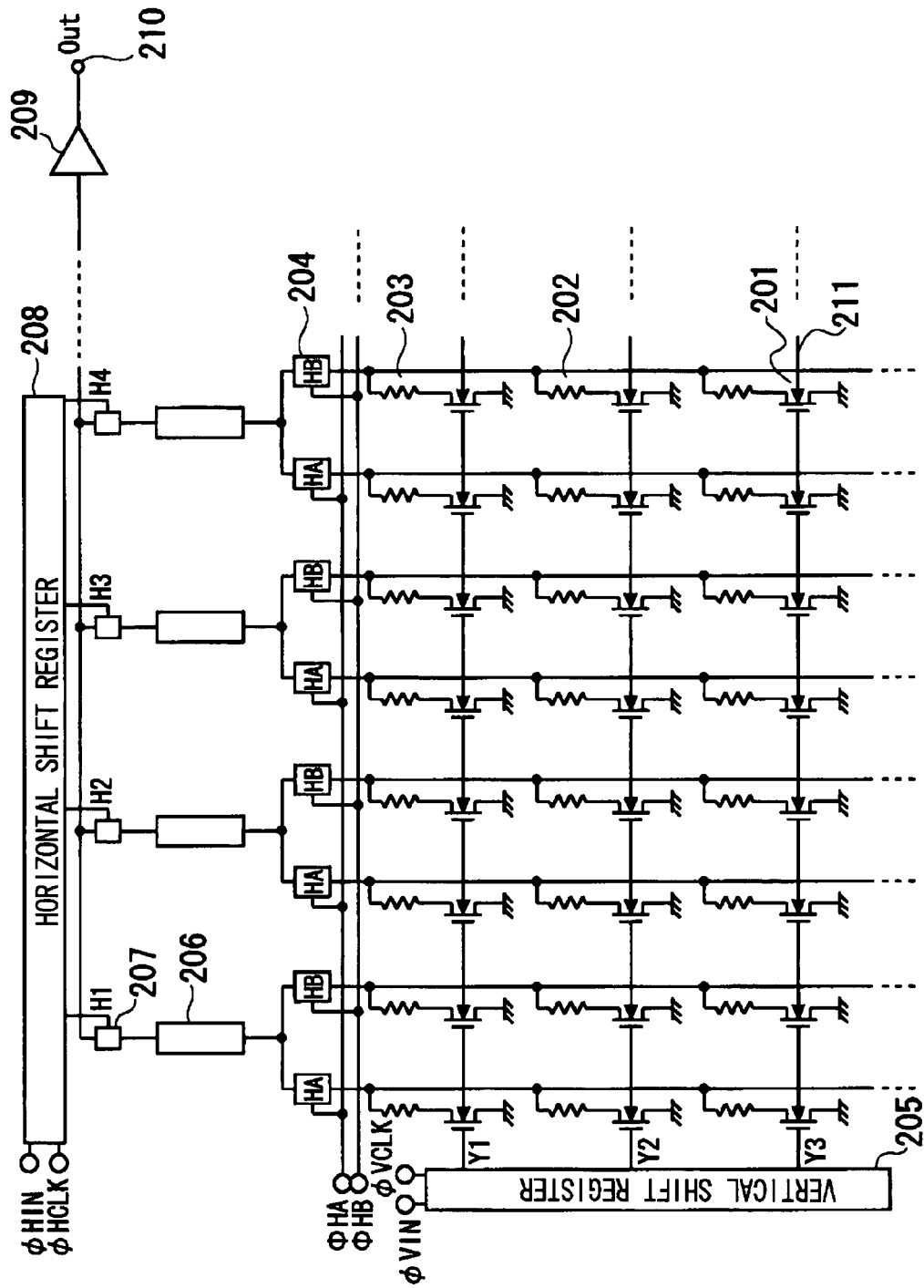
FIG. 4 is a circuit diagram of a readout circuit of Patent Document 1.

Alternatively, in another mode according to the present invention, as shown in FIG. 2, a bias circuit 2' may include an operational amplifier 26 of the voltage follower configuration receiving a first input voltage and supplying the output voltage to the gate of the bias transistor 8, while the bias cancellation circuit 3 may include a source follower circuit 18 receiving a second input voltage and supplying the output voltage to the gate of the canceller transistor 17.

FIG. 1 shows the configuration of a readout circuit according to an example of the present invention. Referring to FIG. 1, a readout circuit 1 includes a bias circuit 2 that applies a constant voltage to a bolometer device 5, and a bias cancellation circuit 3 that removes the offset current which is a signal component other than the object signal. The readout circuit also includes an integrating operational amplifier 4 which is connected to a connection node of the bias circuit 2 and the bias cancellation circuit 3. In FIG. 1, a switch 28 is equivalent to the pixel switch 101 of FIG. 5. A horizontal switch (103 of FIG. 5), which is connected between the bolometer device and the source of the bias transistor, is not shown in FIG. 1. An infrared signal has a significant offset component on which is present a signal component of an extremely low level from an object. The bias cancellation circuit 3 is provided to remove this offset component.

The readout circuit 1 is supplied with an input from a first input voltage line 6 and with an input from a second input voltage line 7. These inputs voltages are supplied in parallel simultaneously.

The operation of the readout circuit 1 is now schematically described. Resistance change in the bolometer device, produced in accordance with intensity of the infrared light from an object, is detected as difference current between the bolometer current, which is a drain current of a bias transistor 8, as determined by first and second input voltages VB1 and VB2, and the current in the bias cancellation circuit 3, which is a drain current of a canceller transistor 17. The difference current is integrated and transformed by the integrating operational amplifier 4 into a corresponding voltage value, which is output.

The specified operation of the bias circuit 2 and the bias cancellation circuit 3 is now described. Initially, with a shutter (not shown) closed, that is, with no light incident on an object, first and second input voltages VB1 and VB2 are adjusted to cause the current flowing in the bolometer device 5 to match the current flowing in the bias cancellation circuit 3. The shutter is then opened. This makes it possible to take out only changes in the current accompanied by resistance changes of the bolometer device 5 brought about by light incident on the object. The respective circuits are now described in detail.

The bias circuit 2 includes an NMOS transistor (bias transistor) 8, having a source connected to one end of the bolometer device 5, and a source follower circuit 9, an input end of which is connected to a first input voltage line 6 and an output end of which is connected to the gate of the bias transistor 8. A constant voltage is applied to each bolometer device 5 from this bias circuit 2 to transform the change in the resistance value of the bolometer device 5 into a current value.

In the present example, the source follower circuit 9 incldues PMOS transistors of lower circuit noise. However, the source follower circuit 9 may also be composed of NMOS transistors. The source follower circuit 9 includes a PMOS transistor of a source follower configuration, with the source voltage following the gate voltage, and a current source transistor connected between the source of the PMOS transistor and the power supply. The PMOS transistor of the source follower configuration has a drain connected to GND, while having a gate connected to the first input voltage line 6, and having a source connected to the gate of the bias transistor 8. The current source transistor (PMOS transistor) has a source connected to the power supply, while having a gate connected to the GND and having the drain connected to the source of the source follower transistor (PMOS transistor). The current source transistor of the source follower circuit may also be a resistor device.

Since the source follower circuit 9 makes it possible to drive the bias transistor 8 with low impedance, it is possible to suppress stray noise of each readout circuit 1.

A first VGS removal voltage generating circuit 10 compensates for the gate source voltages VGS of both the bias transistor 8 of the bias circuit 2 and the PMOS transistor of the source follower circuit 9. The first VGS removal voltage generating circuit 10 has the circuit configuration in which the drain current in the transistors is not affected by the gate-to-source voltage VGS (voltage drop compensation).

More specifically, the first VGS removal voltage generating circuit 10 includes an operational amplifier 14, in addition to the bias transistor 8 of the same characteristics as the transistor of the bias circuit 2 and to the source follower circuit 9. The bias transistor 8 of the first VGS removal voltage generating circuit 10 has a source connected to one end of the bolometer device 5, associated with the first VGS removal voltage generating circuit 10, while having a gate connected to an output end of the source follower circuit 9 of the first VGS removal voltage generating circuit 10, and having a drain connected to +5V.

In the first VGS removal voltage generating circuit 10, the operational amplifier 14 has an output terminal connected to an input end of the source follower circuit 9. The operational amplifier has an inverting output terminal (−) connected to a source of the bias transistor 8, while having a non-inverting input terminal (+) connected to a VB1 input terminal 15 supplied with an input voltage VB1. On the first input voltage line 6, which is connected to the output terminal of the operational amplifier 14, there is supplied a voltage corresponding to the sum of the voltage VB1 and a sum of the gate source voltage VGS of the NMOS transistor 8 and the gate source voltage VGS of the lower transistor of the source follower circuit 9.

The bias cancellation circuit 3 includes a resistor device 16, one end of which is connected to a power supply, a PMOS transistor (canceller transistor) 17, having a source connected to the other end of the resistor device 16, and a source follower circuit 18. This source follower circuit has an input end connected to the second input voltage line 7 and having an output end connected to the gate of the canceller transistor. Similarly to the bias circuit 2, the source follower circuit 18 includes a PMOS transistor with a lower circuit noise. The source follower circuit 18 is made up of a PMOS transistor of the source follower configuration and a current source transistor connected between the source of the PMOS transistor and the power supply. The PMOS transistor of the source follower configuration has a drain connected to GND, while having a gate connected to the second input voltage line 7 and having source connected to the gate of the bias transistor 8. The current source transistor (PMOS transistor) has a source connected to the power supply, while having a gate connected to the GND and having the drain connected to the source of the source follower transistor (PMOS) transistor.

In the bias cancellation circuit 3, since the source follower circuit 18 makes it possible to drive the canceller transistor 17 with low impedance, it becomes possible to suppress the stray noise of each readout circuit 1.

Similarly to the first VGS removal voltage generating circuit 10, a second VGS removal voltage generating circuit 19 compensates the gate-to-source voltages VGS of both the canceller transistor 17 in the bias cancellation circuit 3 and the PMOS transistor of the source follower circuit 18.

More specifically, the second VGS removal voltage generating circuit 19 includes an operational amplifier 20, in addition to a resistor device 16, a switch 27, a bias canceller transistor 17 and a source follower circuit 18, as in the bias cancellation circuit 3. In the second VGS removal voltage generating circuit 19, the bias canceller transistor 17 has a source connected via the switch 27 and a resistor 16 to the power supply VDD, while having a gate connected to an output end of the source follower circuit 18 and having a drain connected to +5V. The operational amplifier 20 has an output terminal connected to an input end of the source follower circuit 18, while having an inverting input terminal (−) connected to the source of the bias canceller transistor 8 and having a non-inverting input terminal (+) connected to a VB2 input terminal 21 supplied with the input voltage VB2. The second input voltage line 7, connected to an output terminal of the operational amplifier 20, is at a voltage equal to a sum of VB2 and the gate-to-source voltages VGS (negative values) of the PMOS transistor 17 and the lower transistor of the source follower circuit 18.

The connection node of the drain of the bias transistor 8 of the bias circuit 2 and the drain of the bias canceller transistor 17 of the bias cancellation circuit 3 is connected to the inverting input terminal (−) of the integrating operational amplifier 4 and to one end of an integrating capacitor 22. The integrating operational amplifier 4 integrates the current variation of the bolometer device 5 (difference between the drain currents of the transistors 8 and 17). The other end of the integrating capacitor 22 is connected to an output terminal of the integrating operational amplifier 4, the non-inverting input terminal (+) of which is connected to +5V.

In this manner, the inverting input terminal (−) of the integrating operational amplifier 4, that is, the drains of the transistor 8 of the bias circuit 2 and the bias canceller transistor 17 of the bias cancellation circuit 3, are normally fixed at +5V.

The integrated voltage of the integrating operational amplifier 4 is taken out at the output terminal of the integrating operational amplifier 4, and output sequentially as output signal from each of the readout circuits 1.

A reset switch (RSTSW) 23 is provided between the inverting input terminal (−) and the output terminal of the integrating operational amplifier 4. The voltage at the inverting input terminal (−) of the integrating operational amplifier 4 is set to +5V, a voltage at the non-inverting input terminal (+) of the integrating operational amplifier 4, by turning the switch (RSTSW) 23 ON after outputting the integrated voltage from the integrating operational amplifier 4.

To the inverting input terminal (−) of the integrating operational amplifier 4 are connected a clip diode A24 and a clip diode A25. These clip diodes are connected between the inverting input terminal (−) of the integrating operational amplifier 4 and the +5V power supply so that the clip diode (A) 24 has an anode connected to +5V and the clip diode (B) 25 has a cathode connected to the +5V. These clip diodes operate so that, when the current in the bolometer 5 or the current in the bias cancellation circuit 3 becomes excessive to cause saturation of the integrating operational amplifier 4, the chip diodes will compensate for this excess current.

Figure 5:
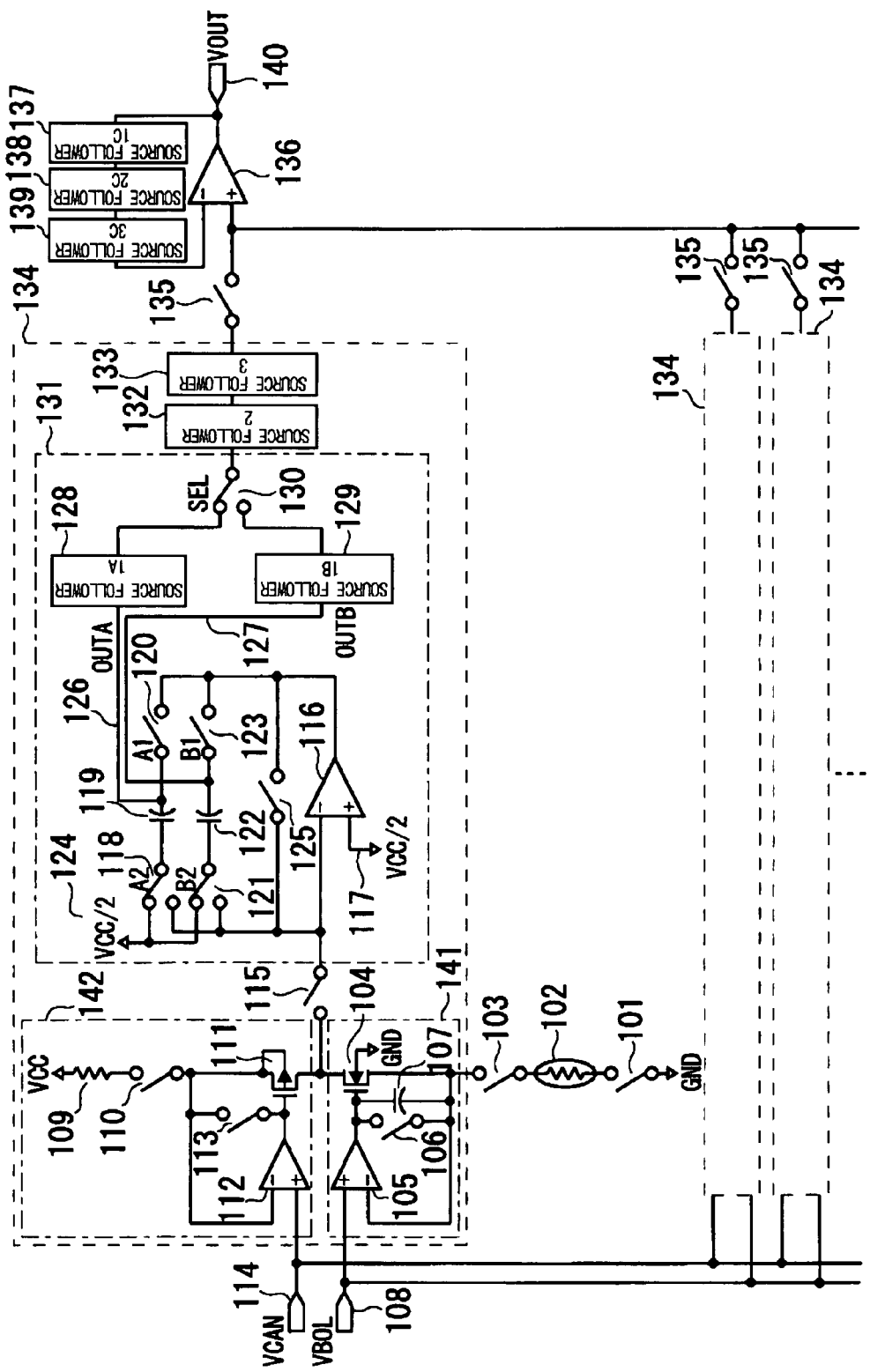
FIG. 5 is a diagram showing an imaging device of Patent Document 1 in its entirety.
Figure 6:
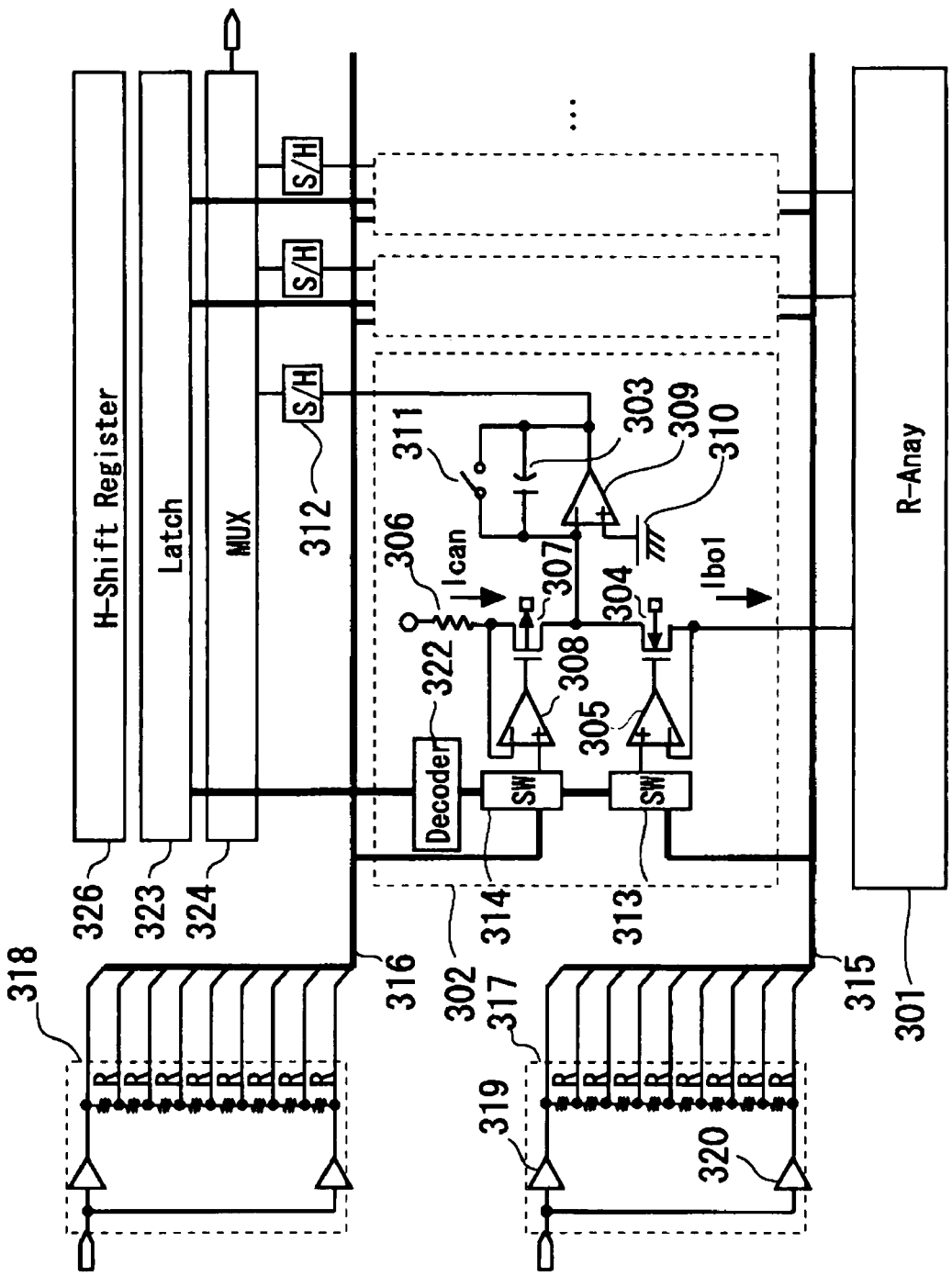
FIG. 6 is a diagram showing the configuration of Patent Document 2.

In the circuits shown in FIG. 5 and FIG. 6, the operational amplifiers (105, 112 of FIG. 5 and 305, 308 of FIG. 6) are used for transistors of the readout circuit 1, in order to suppress temperature drift otherwise caused by the gate-to-source voltage VGS of the bias transistor or the canceller transistor. The operational amplifiers are used to drive the transistors with low impedance and hence are effective to suppress stray noise ascribable to an object at a higher temperature. However, it is necessary to use an operational amplifier of larger area and higher power consumption to reduce noise in e.g. the readout circuit.

In contrast, in the present example, in which the bias transistor 8 and the bias canceller transistor 17 are driven at low impedance, with the use of the source follower circuits 9 and 18, in the bias circuit 2 and the bias cancellation circuit 3, high temperature spurious signals may effectively be prevented as in the case of using operational amplifiers.

The gate-to-source voltage components VGS of both the transistors 8 and 17 and the source follower circuits 9 and 18, in the bias circuit 2 and in the bias cancellation circuit 3, are compensated by one or two VGS removing voltage generating circuits provided within a chip, in other words, for the plural readout circuits 1.

In the present example, unlike the configuration of FIGS. 5 and 6 using operational amplifiers for all of the readout circuits 1, a source follower of a simpler configuration is provided in each of the readout circuits 1, and operational amplifiers are used only in the two VGS removal voltage generating circuits 10 and 19 for the all readout circuits 1. In this manner, the performance comparable to the conventional circuit may be achieved with a smaller area and low power consumption.

A second example of the present invention is now described. FIG. 2 shows the configuration of the present second example. Meanwhile, in FIG. 2, the same or equivalent components are designated by the same reference numerals as those of FIG. 1. In the circuit of FIG. 2, an operational amplifier 26 is used in a bias circuit 2' to apply a voltage to high precision to the bolometer device 5. That is, in the present example, the operational amplifier 26 is used in place of the source follower circuit 9 of the bias circuit 2 of FIG. 1. The operational amplifier 26 has an inverting input terminal (−) connected to the source of the bias transistor 8, while having an output terminal connected to the gate of the bias transistor 8 and having a non-inverting input terminal (+) connected to the first input voltage line 6.

This yields a circuit configuration in which the drain current of the bias transistor 8 is not affected by the gate-to-source voltage VGS of the bias transistor 8, because the voltage applied to the bolometer device 5 is the voltage at the non-inverting input terminal (+) of the operational amplifier 26, that is, the voltage at the first input voltage line 6, thus making it possible to control the voltage applied to the bolometer device 5 with high accuracy.

In general, a bolometer device has resistance variations from device to device, due to fabrication process. If the resistance variations are to be corrected in order to detect a very small infrared signal, it is necessary to adjust the voltage applied to the bolometer device, from one readout circuit to another, to make bolometer current, that is, drain current of the bias transistors 8, uniform.

In the above-described example, shown in FIG. 1, the drain current is not changed linearly against the gate voltage of the bias transistor 8. In addition, the drain voltage is also varied with changes in the resistance of the bolometer device 5 during integration. Thus, in the example, shown in FIG. 1, there may be such a case where the variations cannot be corrected accurately.

Thus, in the present example, an operational amplifier 26, adapted to control the drain voltage, that is, the voltage applied to the bolometer device 5, with high accuracy, is used in the bias circuit 2'. By so doing, it is possible in the present example to make the chip size and power consumption smaller than those of the conventional configuration employing an operational amplifier for each of the bias circuit and the bias cancellation circuit provided in the readout circuit.

Although the present invention has so far been described with reference to preferred examples, the present invention is not to be restricted to the examples. It is to be appreciated that those skilled in the art can change or modify the examples without departing from the scope and spirit of the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A semiconductor device comprising:
a plurality of readout circuits each including:
a bias circuit that supplies a bias voltage to a bolometer device;
a bias cancellation circuit that removes an offset current of said bolometer device; and
an integrator that has an input end connected to a connection node of said bias circuit and said bias cancellation circuit;
said bias circuit including:
an operational amplifier, configured as a follower, and that receives a voltage on a first input voltage line as an input and outputs a voltage which follows the input voltage; and
a bias transistor that receives the output voltage of said operational amplifier and supplies a bias voltage to one end of said bolometer device;
said bias cancellation circuit including:
a follower transistor that receives a voltage on a second input voltage line as input and outputs a voltage which follows said input voltage, said follower transistor forms a source follower circuit; and
a canceller transistor that receives an output voltage of said follower transistor and that has a gate connected to an output of said source follower circuit;
an output of said canceller transistor and an output of said bias transistor being coupled to said input end of said integrator.

2. The semiconductor device according to claim 1, wherein
said bias transistor is a MOS transistor of a first conductivity type, that has a gate connected to an output of said operational amplifier, and has a source connected to one end of said bolometer device; and
said canceller transistor is a MOS transistor of a second conductivity type, has a source connected to a power supply via a resistor and a switch and has a drain connected to the drain of said bias transistor.

3. The semiconductor device according to claim 2, wherein
said operational amplifier of said bias circuit has a non-inverting input terminal connected to said first input voltage line and has an inverting input terminal connected to a source of said bias transistor.

4. The semiconductor device according to claim 2, further comprising:
a VGS removal voltage generating circuit that supplies a sum voltage of said second input voltage and a voltage corresponding to a gate-to-source voltage of said canceller transistor to said second input voltage line.

5. The semiconductor device according to claim 4, wherein
one said VGS removal voltage generating circuit is provided for a plurality of said readout circuits.

6. The semiconductor device according to claim 2, further comprising:
a VGS removal voltage generating circuit including:
a second operational amplifier that has a non-inverting input terminal supplied with a second input voltage;
a second source follower circuit that receives an output of said second operational amplifier; and
a MOS transistor of a second conductivity type, that has a gate supplied with an output voltage of said second source follower circuit, has a drain connected to a preset voltage and has a source connected to a power supply via a resistor and a switch;
said MOS transistor of the second conductivity type being connected to an inverting input terminal of said operational amplifier;
an output of said second operational amplifier being connected to said second input voltage line.

* * * * *